R. E. MOREY.
Handle for Fruit-Boxes, &c.

No. 201,036. Patented March 5, 1878.

Witnesses
Geo. H. Strong.
Frank A. Brooks.

Inventor
Roswell E. Morey
By Dewey & Co
Atty's.

UNITED STATES PATENT OFFICE.

ROSWELL E. MOREY, OF SAN FRANCISCO, CALIFORNIA.

IMPROVEMENT IN HANDLES FOR FRUIT-BOXES, &c.

Specification forming part of Letters Patent No. 201,036, dated March 5, 1878; application filed July 25, 1877.

*To all whom it may concern:*

Be it known that I, ROSWELL E. MOREY, of the city and county of San Francisco, and State of California, have invented Improvements in Handles for Boxes; and I do hereby declare the following to be a full, clear, and exact description thereof, reference being had to the accompanying drawings.

My invention relates to certain improvements in applying flexible handles to boxes.

My improvement is intended to be applied more especially to that class of boxes in which strawberries and other small fruit are packed in drawers for transportation.

Figure 1:
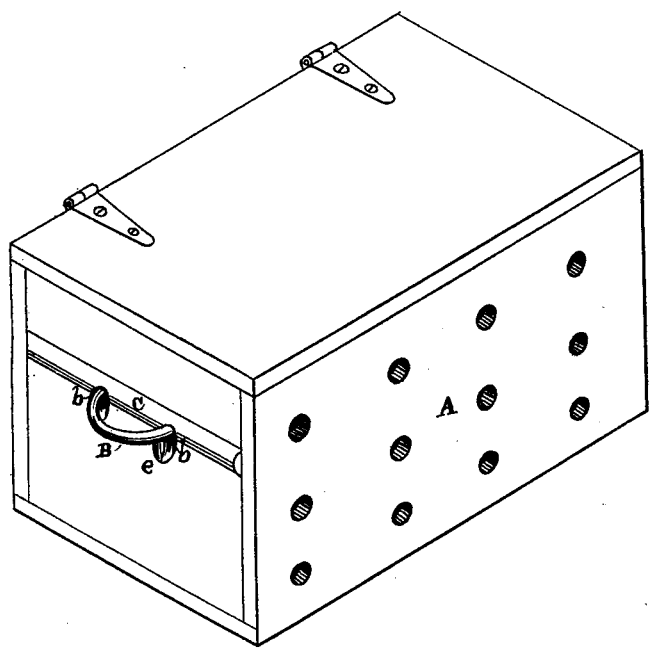
Figure 2:
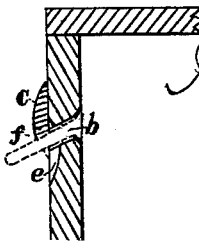

Referring to the accompanying drawings, Figure 1 is a perspective view of my invention, and Fig. 2 a section of one end of the box.

Let A represent a strawberry or other box or case. At each end of this box I attach a flexible handle, B, in the following manner: The piece of rope or other material which is to serve as a handle I first cover with leather, so as to protect it and give it a smooth surface. I then bore two holes, $b\ b$, in the end of the box, at the proper distance apart, into and through which the ends of the covered rope or other flexible handle are to be passed. Around each of these holes I make a counter-sink inside of the box, in which the ends of the leather cover of the handle are spread and secured by tacks or other fastening, thus leaving the inside surface smooth, so as not to interfere with the sliding of the drawers. I then cut an inclined groove, $e$, on the outside of the box, extending from the lower side of each hole downward from one to two inches. This groove will permit the flexible handle to lie close against the end of the box when it is pressed downward, without bending short over a corner, as would be the case if the channel were not used. I then secure a wooden strip, $c$, across the end of the box, so that its lower edge will partially cover the holes; and directly opposite each hole I cut out that portion, $f$, which covers the hole, so that when the handle is grasped by the hand and pulled upward it will strike the edges of the cut-away portions $f$, and prevent the knuckles of the hand from coming in contact with the end of the box. Any projection secured around the upper side of the holes will answer this purpose, In piling a number of these boxes, the wooden strips C on their ends will come in contact and prevent the handles from chafing.

Having thus described my invention, what I claim, and desire to secure by Letters Patent, is—

The box A, having the inclined holes $b\ b$ in the ends thereof and inclined grooves $e$ adjacent to said holes, cross-strip $c$, with its notches $f$, and the flexible handle B, all combined and arranged to operate substantially as above specified.

In witness whereof I have hereunto set my hand and seal.

ROSWELL E. MOREY. [L. S.]

Witnesses:
  FRANK ANDREWS BROOKS,
  WM. H. THOMPSON.